United States Patent
Hong et al.

(10) Patent No.: US 12,483,966 B2
(45) Date of Patent: Nov. 25, 2025

(54) METHOD AND APPARATUS FOR PERFORMING RELAYING ON BASIS OF DATA INACTIVITY TIMER

(71) Applicant: LG Electronics Inc., Seoul (KR)

(72) Inventors: Jongwoo Hong, Seoul (KR); Seungmin Lee, Seoul (KR); Seoyoung Back, Seoul (KR); Giwon Park, Seoul (KR)

(73) Assignee: LG Electronics Inc., Seoul (KR)

( * ) Notice: Subject to any disclaimer, the term of this patent is extended or adjusted under 35 U.S.C. 154(b) by 428 days.

(21) Appl. No.: 18/011,429

(22) PCT Filed: Jun. 16, 2021

(86) PCT No.: PCT/KR2021/007551
§ 371 (c)(1),
(2) Date: Dec. 19, 2022

(87) PCT Pub. No.: WO2022/014877
PCT Pub. Date: Jan. 20, 2022

(65) Prior Publication Data
US 2023/0247519 A1    Aug. 3, 2023

(30) Foreign Application Priority Data
Jul. 17, 2020  (KR) ........................ 10-2020-0089041

(51) Int. Cl.
*H04W 40/22* (2009.01)
*H04W 36/00* (2009.01)
(Continued)

(52) U.S. Cl.
CPC ........... *H04W 40/22* (2013.01); *H04W 36/03* (2018.08); *H04W 76/23* (2018.02); *H04W 76/27* (2018.02);
(Continued)

(58) Field of Classification Search
CPC ..... H04W 40/22; H04W 36/03; H04W 76/23; H04W 76/27; H04W 76/28; H04W 76/38;
(Continued)

(56) References Cited

U.S. PATENT DOCUMENTS 12,185,416 B2 * 12/2024 Liang .................... H04W 76/38
2020/0037218 A1 * 1/2020 Karampatsis ....... H04W 36/087
(Continued)

FOREIGN PATENT DOCUMENTS

CN       110830952      2/2020
KR      20180034524     4/2018
(Continued)

OTHER PUBLICATIONS

3GPP, 3rd Generation Partnership Project; Technical Specification Group Radio Access Network; NR; Radio Resource Control (RRC) protocol specification (Release 16), TS 38.331 V16.0.0, Mar. 2020, 836 pages.

*Primary Examiner* — Afshawn M Towfighi
(74) *Attorney, Agent, or Firm* — Fish & Richardson P.C.

(57) ABSTRACT

Provided are a method for performing wireless communication by a first device relaying communication between a second device and a base station, and an apparatus for supporting same. The method may comprise the steps of: establishing a first radio resource control (RRC) connection to the base station; establishing a PC5 connection to the second device; on the basis that there is no data transmission and reception between the first device and the base station, initiating a Uu data inactivity timer; on the basis that there is no data transmission and reception between the first device and the second device, initiating a sidelink (SL) data inactivity timer; and on the basis that the Uu data inactivity
(Continued)

timer and the SL data inactivity timer are expired, releasing the first RRC connection between the first device and the base station.

20 Claims, 21 Drawing Sheets

(51) Int. Cl.
　　*H04W 76/23* (2018.01)
　　*H04W 76/27* (2018.01)
　　*H04W 76/28* (2018.01)
　　*H04W 76/38* (2018.01)
　　*H04W 88/04* (2009.01)

(52) U.S. Cl.
　　CPC .......... *H04W 76/28* (2018.02); *H04W 76/38* (2018.02); *H04W 88/04* (2013.01)

(58) Field of Classification Search
　　CPC ... H04W 88/04; H04W 36/033; H04W 76/14; H04W 92/18
　　See application file for complete search history.

(56) References Cited

U.S. PATENT DOCUMENTS

| 2021/0251037 | A1* | 8/2021 | Akkarakaran | ........ H04W 76/28 |
| 2021/0251039 | A1* | 8/2021 | Liang | .................... H04W 76/27 |
| 2022/0225447 | A1* | 7/2022 | Wänstedt | .............. H04W 72/02 |
| 2023/0180313 | A1* | 6/2023 | Freda | .................... H04W 76/14 |
| | | | | 370/310 |
| 2023/0247519 | A1* | 8/2023 | Hong | .................... H04W 92/18 |
| | | | | 370/315 |

FOREIGN PATENT DOCUMENTS

| KR | 20180071259 | | 6/2018 | |
| KR | 102072588 | | 2/2020 | |
| WO | WO-2021091115 A1 * | | 5/2021 | ............ H04W 24/10 |

\* cited by examiner

METHOD AND APPARATUS FOR PERFORMING RELAYING ON BASIS OF DATA INACTIVITY TIMER

CROSS-REFERENCE TO RELATED APPLICATIONS

This application is a National Stage application under 35 U.S.C. § 371 of International Application No. PCT/KR2021/007551, filed on Jun. 16, 2021, which claims the benefit of Korean Patent Application No. 10-2020-0089041, filed on Jul. 17, 2020. The disclosures of the prior applications are incorporated by reference in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

Meanwhile, if a relay UE releases an RRC connection, a problem in which a remote UE cannot communicate with a network through the relay UE may occur. However, it may not be desirable in terms of power consumption to always maintain the RRC connection while the relay UE is in a linked state, even though there is no transmission/reception of data through Uu link between the relay UE and the network.

In one embodiment, provided is a method for performing wireless communication by a first device relaying communication between a second device and a base station. The method may comprise: establishing a first radio resource control (RRC) connection with the base station: establishing a PC5 connection with the second device; starting a Uu data inactivity timer, based on no data transmission or reception between the first device and the base station; starting a sidelink (SL) data inactivity timer, based on no data transmission or reception between the first device and the second device; and releasing the first RRC connection between the first device and the base station, based on an expiration of the Uu data inactivity timer and the SL data inactivity timer. The Uu data inactivity timer may be configured for the first device, and the SL data inactivity timer may be configured for the first device.

In one embodiment, provided is a first device adapted to relay communication between a second device and a base station. The first device may comprise: one or more memories storing instructions: one or more transceivers; and one or more processors connected to the one or more memories and the one or more transceivers. The one or more processors may execute the instructions to: establish a first radio resource control (RRC) connection with the base station: establish a PC5 connection with the second device; start a Uu data inactivity timer, based on no data transmission or reception between the first device and the base station; start a sidelink (SL) data inactivity timer, based on no data transmission or reception between the first device and the second device: and release the first RRC connection between the first device and the base station, based on an expiration of the Uu data inactivity timer and the SL data inactivity timer. The Uu data inactivity timer may be configured for the first device, and the SL data inactivity timer may be configured for the first device.

If at least one of the Uu data inactivity timer and the SL data inactivity timer does not expire, the relay UE may not enter an RRC_IDLE state. Therefore, the relay UE can continuously relay data of the remote UE.

DETAILED DESCRIPTION

DESCRIPTION OF EXEMPLARY EMBODIMENTS

Figure 1:
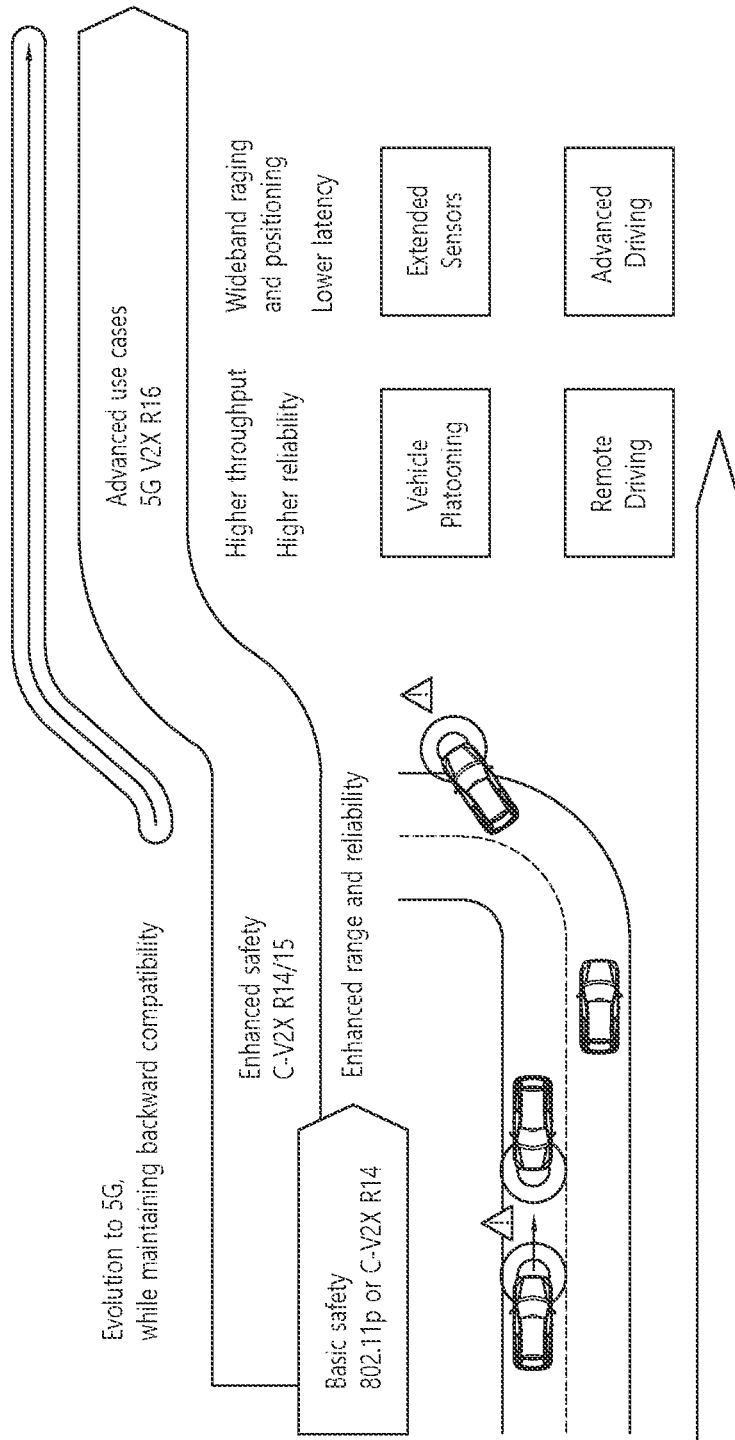
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B. or C" may mean "only A", "only B", "only C", or "any combination of A, B, C".

A slash (/) or comma used in the present disclosure may mean "and/or". For example, "A/B" may mean "A and/or B". Accordingly, "AB" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A. B, and C" may mean "only A". "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
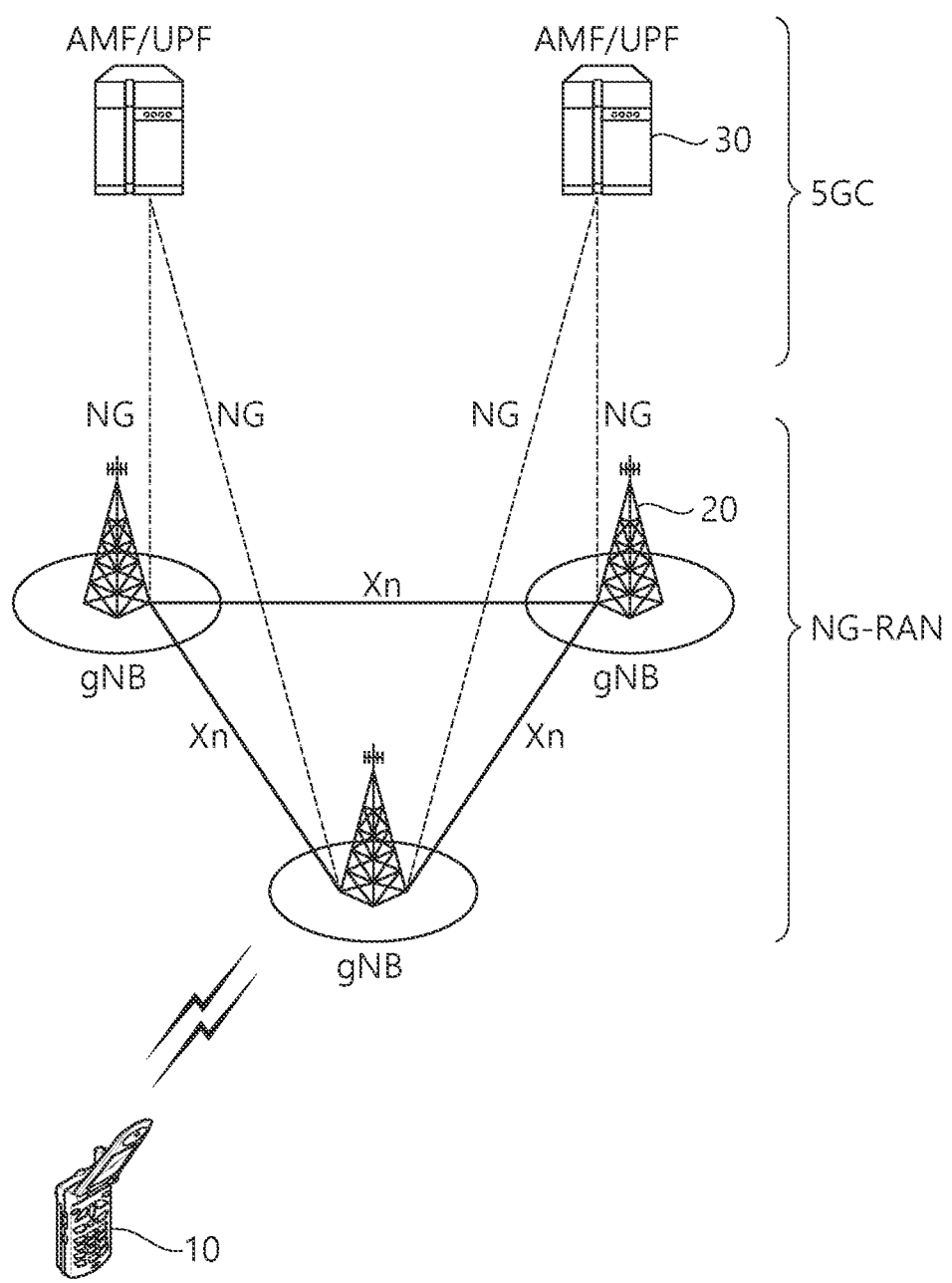
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
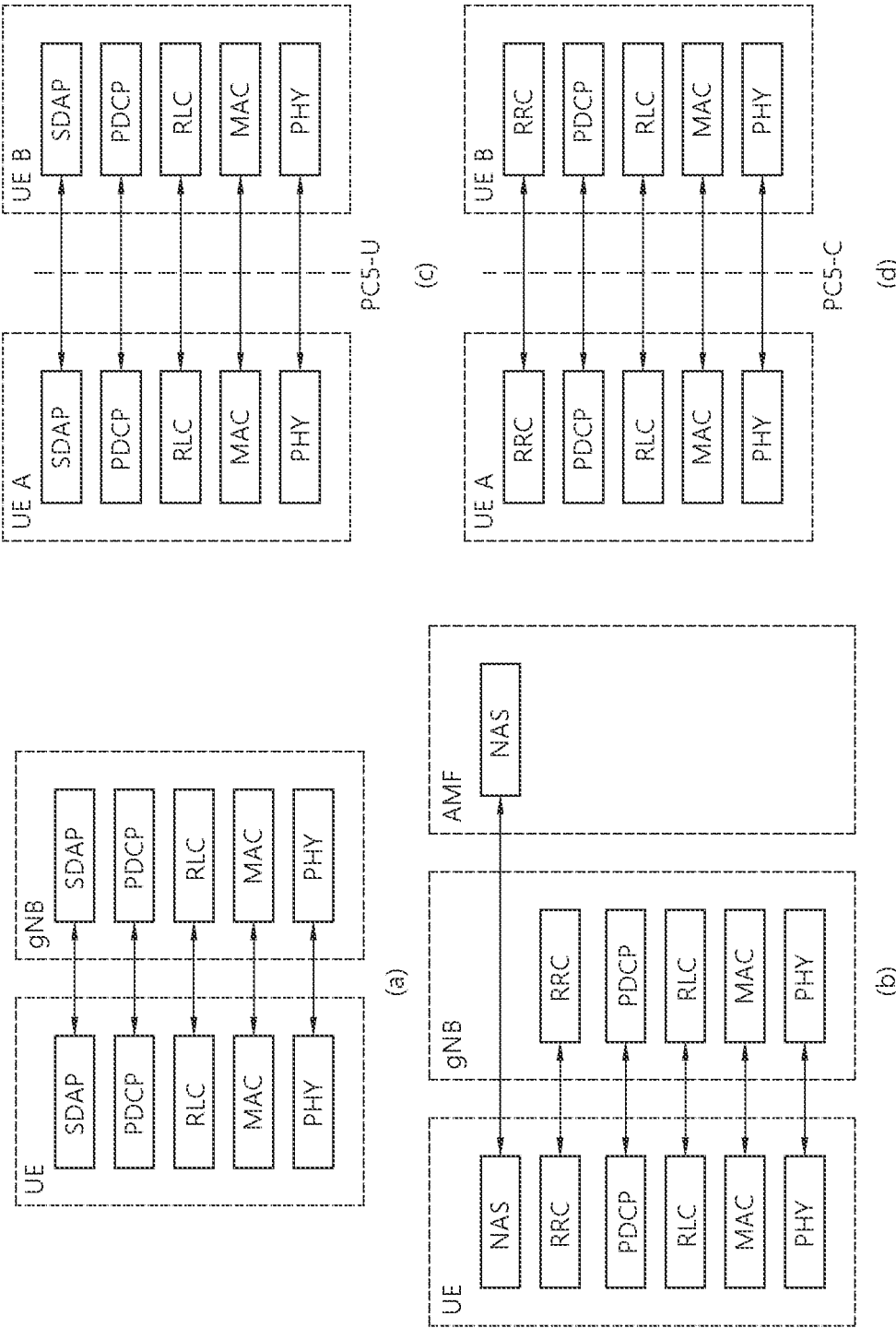
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
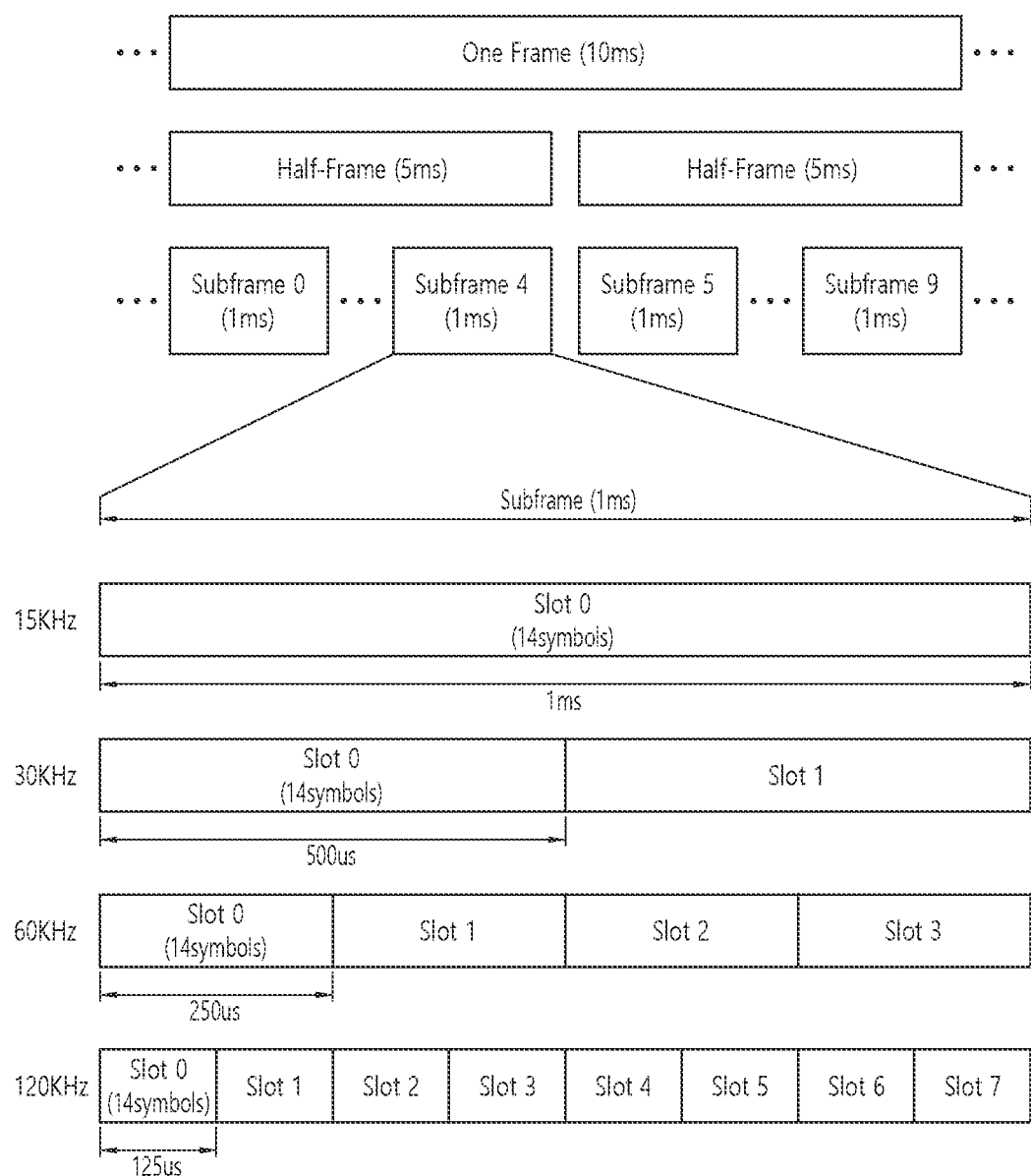
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier- FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
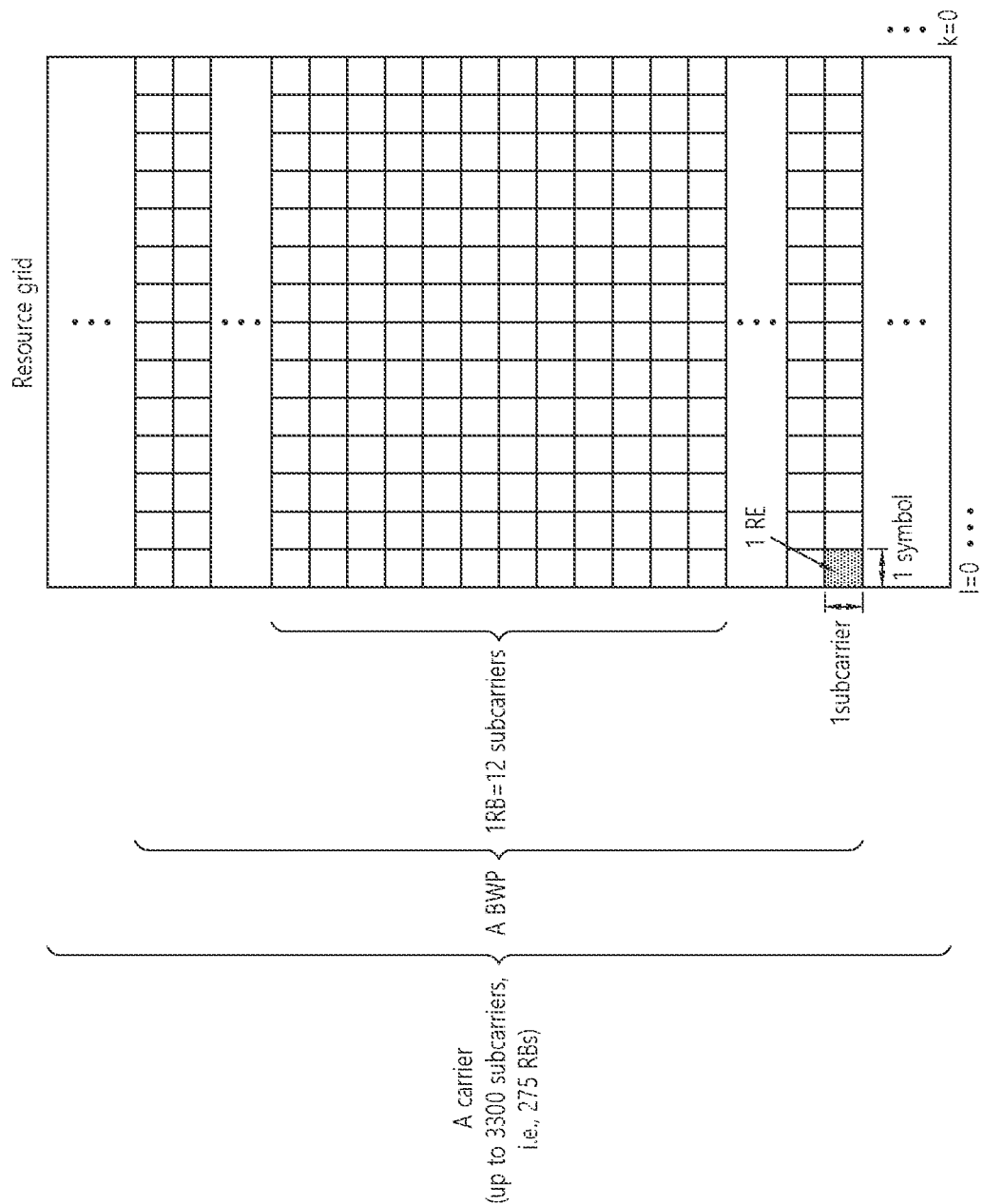
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
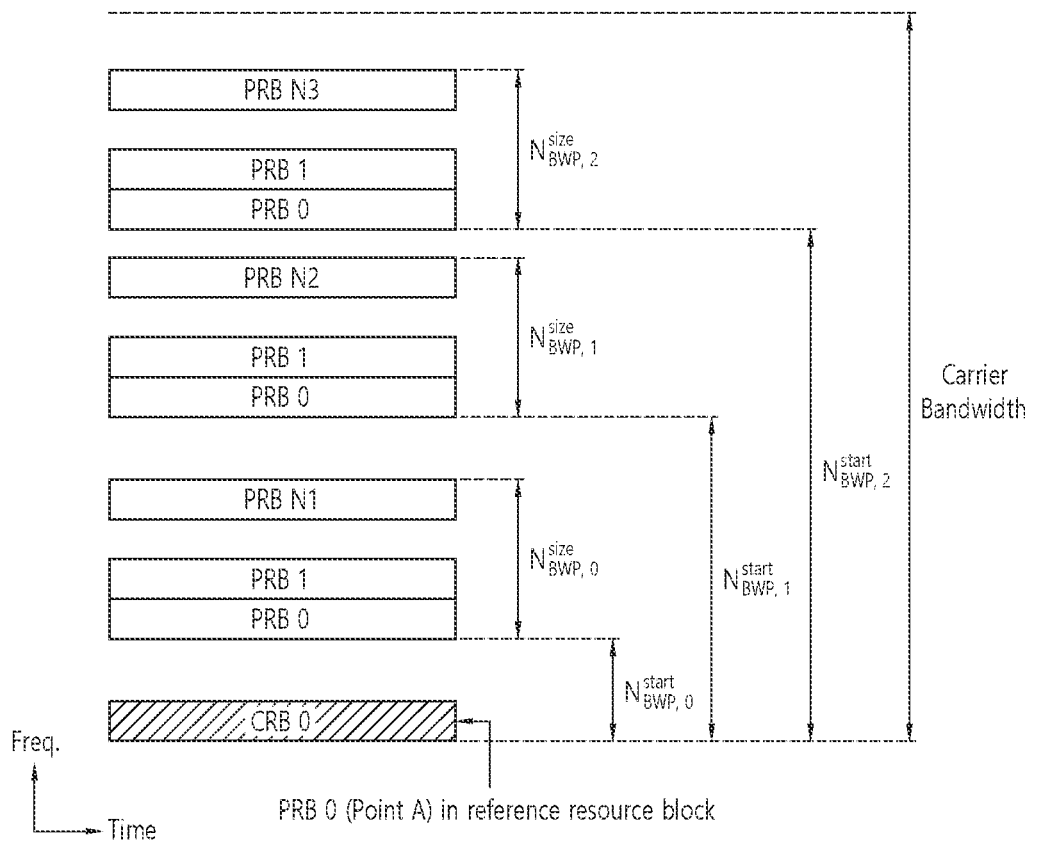
FIG. 6 shows an example of a BWP based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
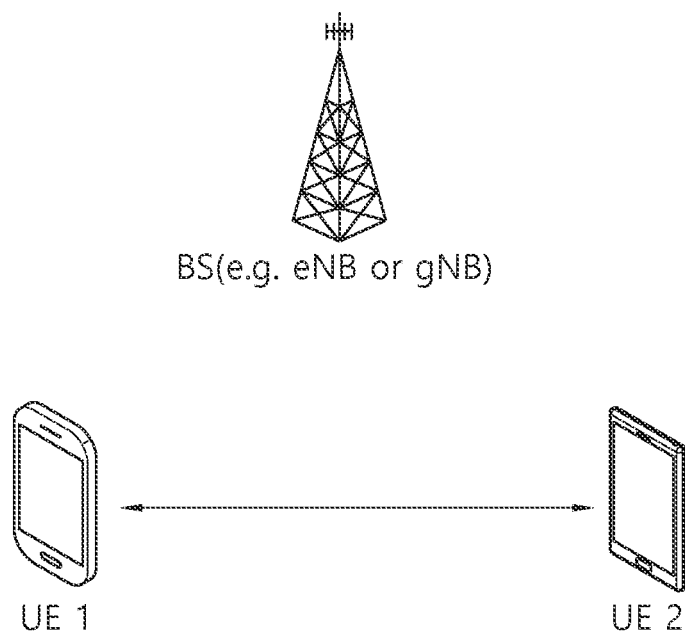
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
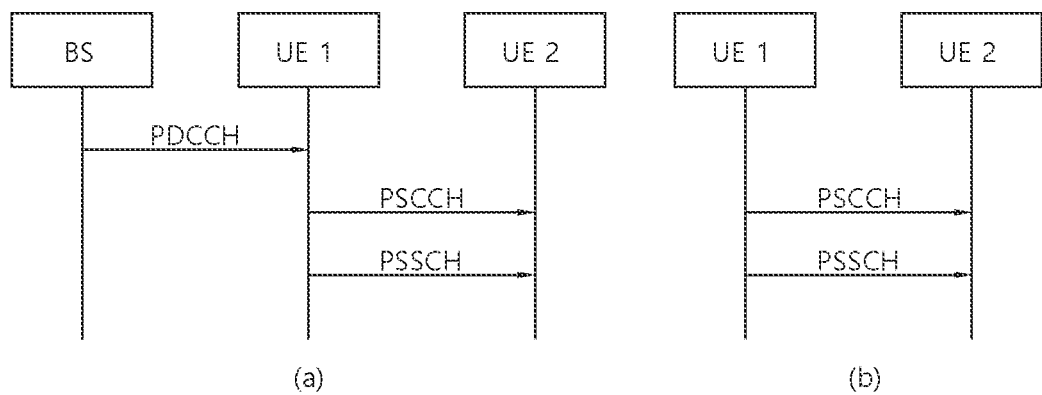
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Hereinafter, a sidelink control information (SCI) will be described.

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a $1^{st}$ SCI, and an SCI including a second SCI configuration field group may be referred to as a second SCI or a $2^{nd}$ SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or SL CSI report request indicator or SL (L1) RSRP (and/or SL (L1) RSRQ and/or SL (L1) RSSI) report request indicator, and/or SL CSI transmission indicator (or SL (L1) RSRP (and/or SL (L1) RSRQ and/or SL (L1) RSSI) information transmission indicator)) (on PSSCH), and/or MCS information, and/or Transmit power information, and/or L1 destination ID information and/or L1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or information on the number of (to-be-transmitted) SL CSI-RS antenna ports, and/or Location information of a transmitting UE or location (or distance region) information of a target receiving UE (for which SL HARQ feedback is requested), and/or Reference signal (e.g., DMRS, etc.) related to channel estimation and/or decoding of data to be transmitted through a PSSCH, e.g., information related to a pattern of a (time-frequency) mapping resource of DMRS, rank information, antenna port index information For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

Hereinafter, a hybrid automatic repeat request (HARQ) procedure will be described.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or reference signal received power (RSRP).

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH, PSFCH, a subchannel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Hereinafter, SL radio link monitoring (RLM) will be described.

In case of AS-level link management of unicast, SL radio link monitoring (RLM) and/or radio link failure (RLF) declaration may be supported. In case of RLC acknowledged mode (AM) in SL unicast, the RLF declaration may be triggered by an indication from RLC indicating that the maximum number of retransmissions has been reached. An AS-level link status (e.g., failure) may need to be informed to a higher layer. Unlike the RLM procedure for unicast, a groupcast-related RLM design may not be considered. The RLM and/or RLF declarations may not be necessary between group members for groupcast.

For example, a transmitting UE may transmit a reference signal to a receiving UE, and the receiving UE may perform SL RLM by using the reference signal. For example, the receiving UE may declare SL RLF by using the reference signal. For example, the reference signal may be referred to as an SL reference signal.

Hereinafter, SL measurement and reporting will be described.

For the purpose of QoS prediction, initial transmission parameter setting, link adaptation, link management, admission control, or the like, SL measurement and reporting (e.g., RSRP, RSRQ) between UEs may be considered in SL. For example, a receiving UE may receive a reference signal from a transmitting UE, and the receiving UE may measure a channel state for the transmitting UE based on the reference signal. In addition, the receiving UE may report channel state information (CSI) to the transmitting UE. SL-related measurement and reporting may include measurement and reporting of CBR and reporting of location information. Examples of channel status information (CSI) for V2X may include a channel quality indicator (CQI), a precoding matrix index (PM), a rank indicator (RI), reference signal received power (RSRP), reference signal received quality (RSRQ), pathgain/pathloss, a sounding reference symbol (SRS) resource indicator (SRI), a SRI-RS resource indicator (CRI), an interference condition, a vehicle motion, or the like. In case of unicast communication, CQI, RI, and PMI or some of them may be supported in a non-subband-based aperiodic CSI report under the assumption of four or less antenna ports. A CSI procedure may not be dependent on a standalone reference signal (RS). A CSI report may be activated or deactivated based on a configuration.

For example, the transmitting UE may transmit CSI-RS to the receiving UE, and the receiving UE may measure CQI or RI based on the CSI-RS. For example, the CSI-RS may be referred to as SL CSI-RS. For example, the CSI-RS may be confined within PSSCH transmission. For example, the transmitting UE may perform transmission to the receiving UE by including the CSI-RS on the PSSCH.

Meanwhile, in the case of performing SL relay, a remote UE and a relay UE may find each other and set up a PC5 connection with each other through PC5-signaling. For example, the remote UE and the relay UE may set up a PC5-RRC connection. In this way, a state in which the PC5 connection and/or the PC5-RRC connection is established between the relay UE and the remote UE may be defined as a linked state.

Figure 9:
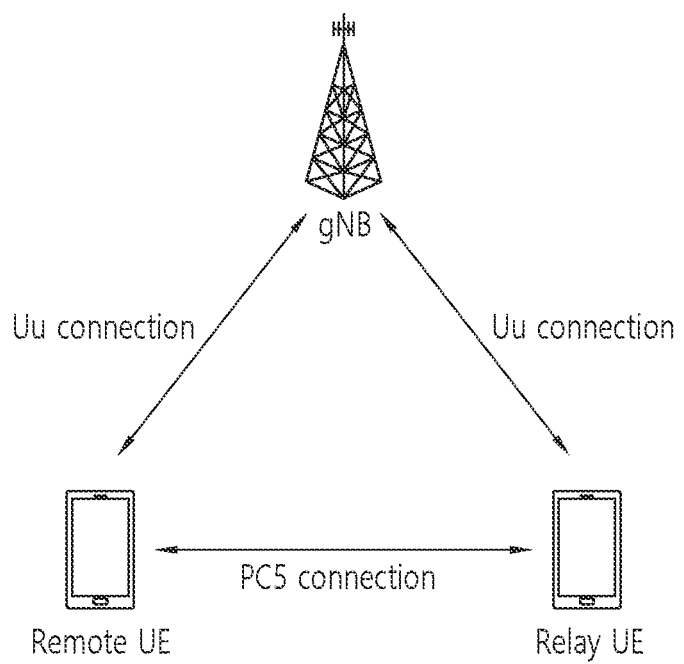
FIG. 9 shows an example of a relay scenario, based on an embodiment of the present disclosure.

FIG. 9 shows an example of a relay scenario, based on an embodiment of the present disclosure. The embodiment of FIG. 9 may be combined with various embodiments of the present disclosure.

Meanwhile, a relay UE in a linked state may transmit data by using Uu link and SL in order to relay data of a remote UE. For example, the relay UE in the linked state may relay data for the remote UE through the Uu link and/or the SL. In the above case, according to the legacy operation, if there is no Uu data transmitted to the relay UE for a certain duration, a data inactivity timer may expire, the relay UE may autonomously release an RRC connection, and the relay UE may inform an RRC layer of this. For example, if there is no Uu data received by the relay UE for the certain duration and the data inactivity timer expires, the relay UE may directly release the RRC connection, and the relay UE may transfer information related to the release to the RRC layer.

Meanwhile, if the relay UE releases the RRC connection, a problem in which the remote UE cannot communicate with the network through the relay UE may occur. However, it may not be desirable in terms of power consumption to always maintain the RRC connection while the relay UE is in the linked state, even though there is no transmission/reception of data through the Uu link between the relay UE and the network.

Figure 10:
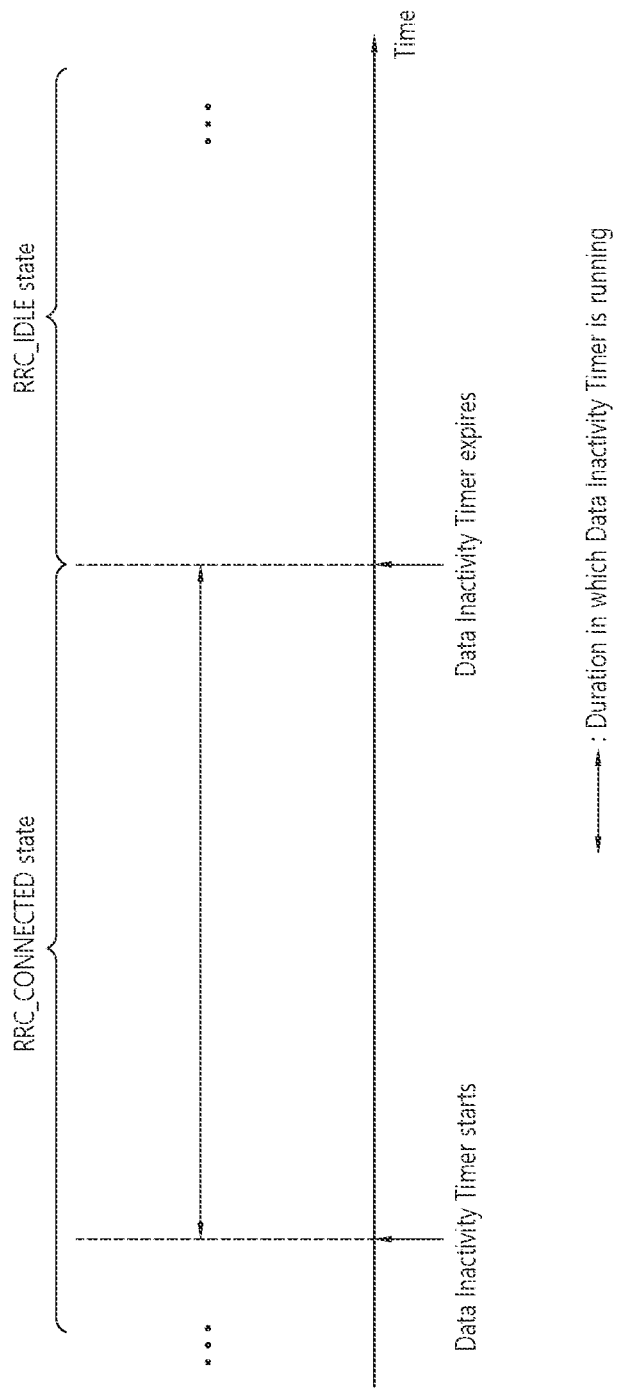
FIG. 10 is a diagram for explaining problems that may occur when a UE enters an RRC_IDLE state due to an expiration of a data inactivity timer.

FIG. 10 is a diagram for explaining problems that may occur when a UE enters an RRC_IDLE state due to an expiration of a data inactivity timer. The embodiment of FIG. 10 may be combined with various embodiments of the present disclosure.

Referring to FIG. 10, if a data inactivity timer expires, the UE which is in an RRC_CONNECTED state enters an RRC_IDLE state. In this case, in case that the UE is a relay UE, if the relay UE enters the RRC_IDLE state due to the expiration of the data inactivity timer of the relay UE, a problem may occur in which data of the remote UE connected with the relay UE cannot be transmitted to the base station. Therefore, even if the data inactivity timer expires, in order to relay data of the remote UE, the relay UE needs not to enter the RRC_IDLE state during the time when reception of SL data is expected.

Therefore, it is necessary to propose a method for solving the above problems and device(s) supporting the same.

Based on various embodiments of the present disclosure, a method for releasing, by a relay UE, an RRC connection between the relay UE and a base station based on a data inactivity timer and the device(s) supporting the same will be described.

Figure 11:
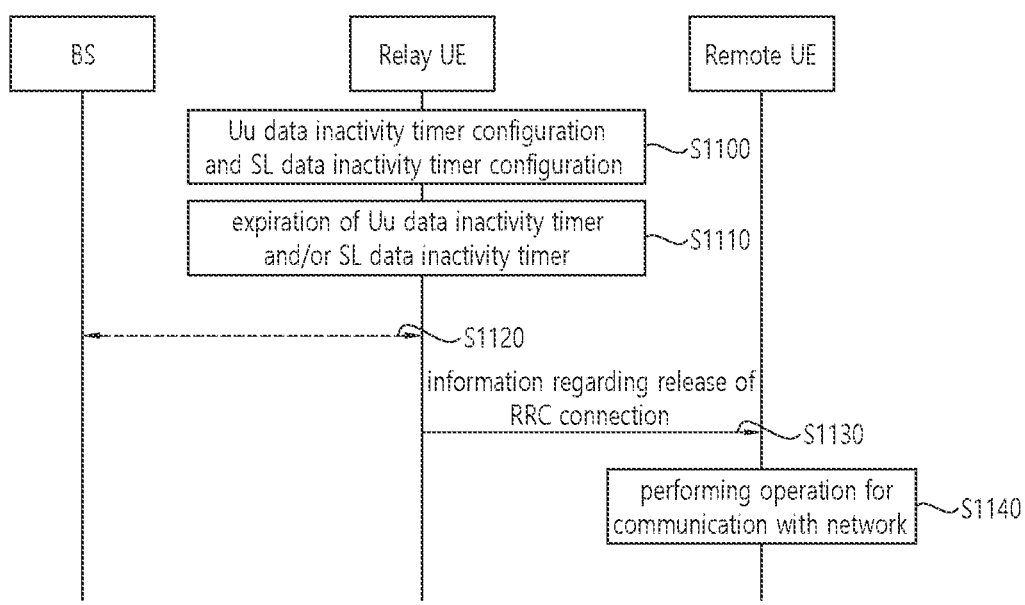
FIG. 11 shows a procedure for releasing a connection by a relay UE based on a data inactivity timer, based on an embodiment of the present disclosure.

FIG. 11 shows a procedure for releasing a connection by a relay UE based on a data inactivity timer, based on an embodiment of the present disclosure. The embodiment of FIG. 11 may be combined with various embodiments of the present disclosure.

Referring to FIG. 11, in step S1100, the relay UE may be configured with timers for data inactivity of the Uu link and the SL. For example, the relay UE may be configured with timer(s) for data inactivity for at least one of the Uu link or the SL.

For example, the relay UE may be configured with a Uu-data inactivity timer for the Uu link and/or a SL-data inactivity timer for the SL. For example, the Uu-data inactivity timer related to the Uu link and/or the SL-data inactivity timer related to the SL may be configured for the relay UE. For example, the relay UE may receive a configuration related to the Uu-data inactivity timer for the Uu link and/or a configuration related to the SL-data inactivity timer for the SL from the network (e.g., base station).

For example, the relay UE may be configured with a common-data inactivity timer for the Uu link and the SL. For example, the common-data inactivity timer for both the Uu link and the SL may be configured for the relay UE. For example, the relay UE may receive a configuration related to the common-data inactivity timer from the network (e.g., base station).

In step S1110, if at least one of the following conditions is satisfied, the relay UE may determine that the data inactivity timer expires. For example, the expiration of the data inactivity timer may be defined as follows.

If the Uu-data inactivity timer expires
    If the SL-data inactivity timer expires
    If the Uu-data inactivity timer and the SL-data inactivity timer expire
    If the common-data inactivity timer expires Specifically, for example, only if both the Uu-data inactivity timer and the SL-data inactivity timer expire, the relay UE may determine that the data inactivity timer expires. For example, if at least one of the Uu-data inactivity timer or the SL-data inactivity timer does not expire, the relay UE may determine that the data inactivity timer does not expire.

Figure 12:
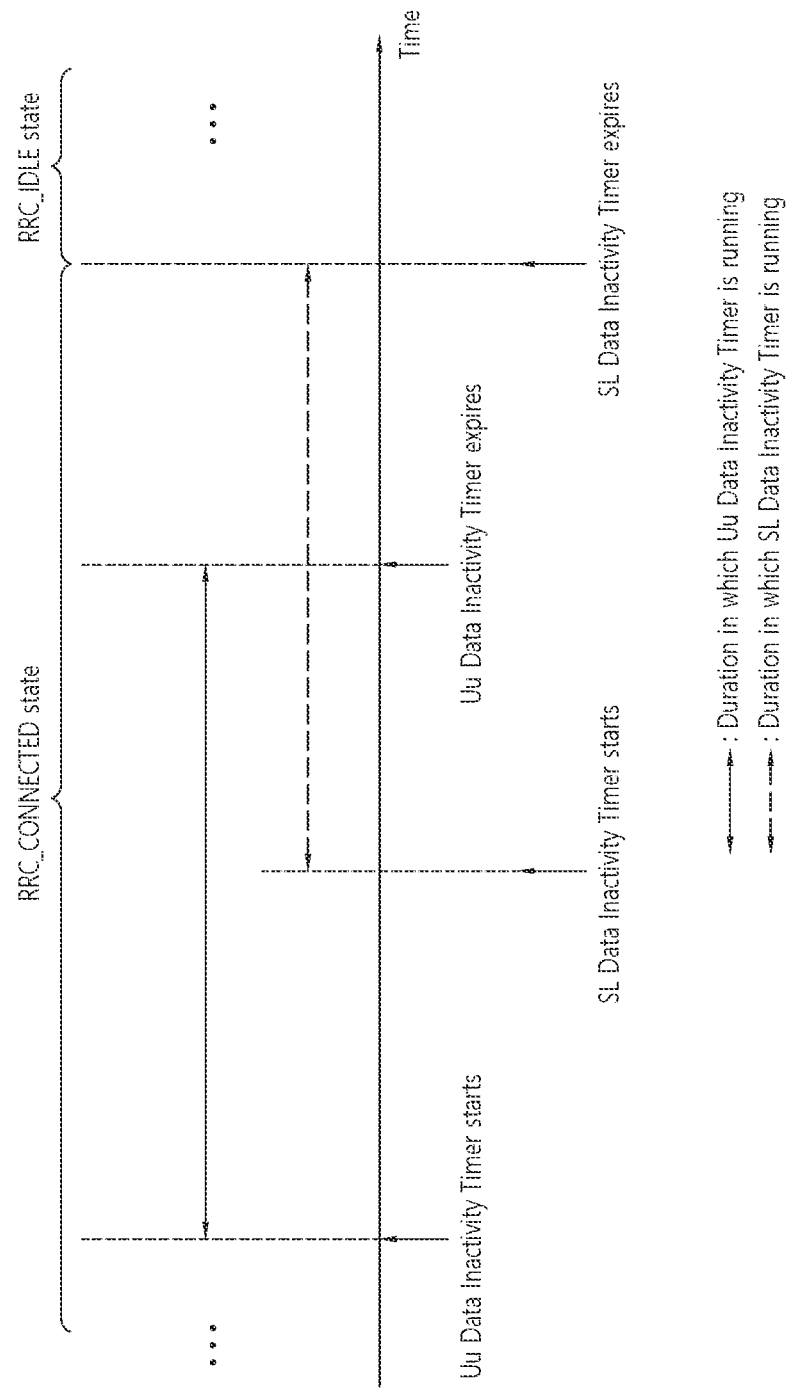
FIG. 12 shows a procedure for releasing a connection by a relay UE based on a SL data inactivity timer and a Uu data inactivity timer, based on an embodiment of the present disclosure.

FIG. 12 shows a procedure for releasing a connection by a relay UE based on a SL data inactivity timer and a Uu data inactivity timer, based on an embodiment of the present disclosure. The embodiment of FIG. 12 may be combined with various embodiments of the present disclosure.

Referring to FIG. 12, if both the SL data inactivity timer and the Uu data inactivity timer expire, the UE may determine that the data inactivity timer expires, and the UE may enter an RRC_IDLE state.

Referring back to FIG. 11, in step S1120, if the data inactivity timer of the relay UE expires, the relay UE may autonomously release the RRC connection.

In step S1130, the relay UE may inform all linked remote UEs of the release of the RRC connection through SL. For example, the relay UE may inform relay UE(s) of the fact of the release of the RRC connection. For example, the relay UE may inform the remote UE of the release of the RRC connection by transmitting notification information through SL. For example, the RRC connection may be an RRC connection between the base station and the relay UE.

In step S1140, if the remote UE(s) receives the notification regarding the release of the RRC connection, the remote UE(s) may perform the following operation. For example, if the remote UE(s) having data to be transmitted/received through the network receives the notification regarding the release of the RRC connection, the remote UE(s) may perform the following operation. For example, if the remote UE(s) which has received the notification regarding the release of the RRC connection needs to additionally transmit/receive data with the network, the remote UE(s) may perform the following operation.

(1) In Case that the Remote UE is in an RRC_IDLE State (In case that the remote UE is out-of-coverage or in-coverage) The remote UE may perform a relay reselection procedure in order to establish a connection with another relay UE, and the remote UE may discover a relay UE. In this case, for example, if the newly selected relay UE is in an RRC_IDLE state, the remote UE may transmit an RRC connection request message to the network through the relay UE. Alternatively, for example, if the newly selected relay UE is in an RRC_CONNECTED state, the remote UE may transmit data to the network through the relay UE.

(In case that the remote UE is in-coverage) The remote UE may directly transmit an RRC connection request message through Uu link in order to establish an RRC connection with the network.

(2) In Case that the Remote UE is in an RRC_CONNECTED State and Uu Link is Also Connected (In case that the remote UE is out-of-coverage or in-coverage) The remote UE may perform a relay reselection procedure in order to establish a connection with another relay UE, and the remote UE may discover a relay UE. In this case, for example, if the newly selected relay UE is in an RRC_IDLE state, the remote UE may transmit an RRC connection request message to the network through the relay UE. Alternatively, for example, if the newly selected relay UE is in an RRC_CONNECTED state, the remote UE may transmit data to the network through the relay UE.

(In case that the remote UE is in-coverage) The remote UE may switch to Uu link and perform direct data communication with the network.

In this way, the relay UE may determine whether or not to release the link, based on data inactivity timer(s) for the Uu link and/or the SL, the relay UE may inform the linked remote UE of information regarding the release. In this case, the remote UE may appropriately determine whether a relay reselection procedure or a switching procedure to Uu link is required, based on the notification, in order for transmission or reception of additional data with the network.

Figure 13:
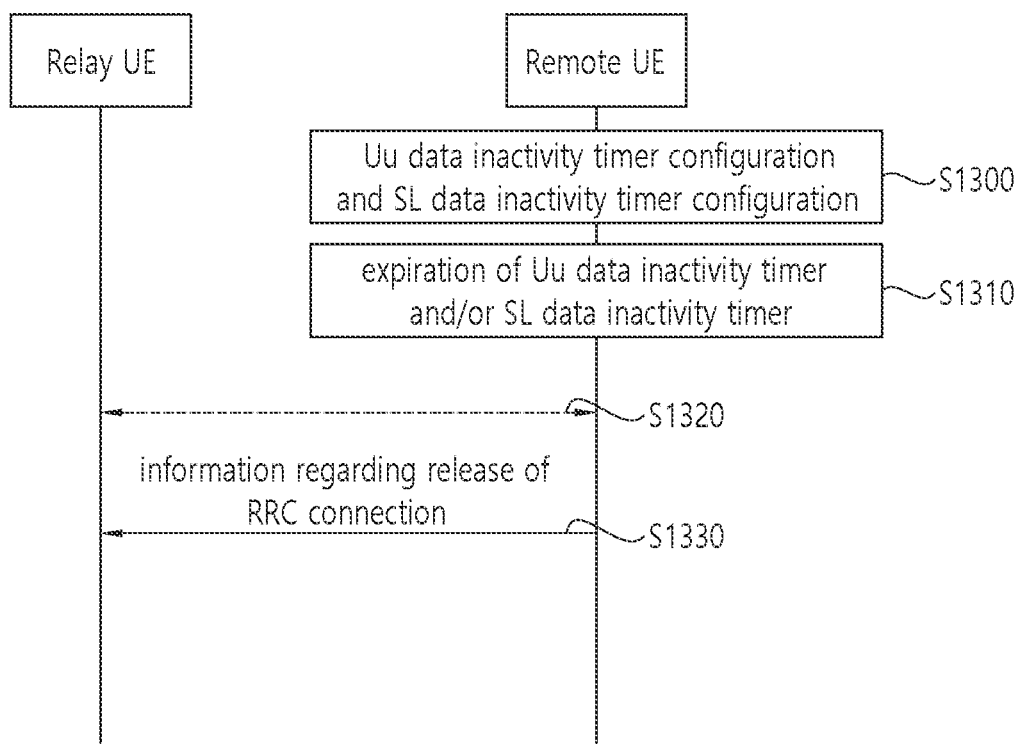
FIG. 13 shows a procedure for releasing a connection by a remote UE based on a data inactivity timer, based on an embodiment of the present disclosure.

FIG. 13 shows a procedure for releasing a connection by a remote UE based on a data inactivity timer, based on an embodiment of the present disclosure. The embodiment of FIG. 13 may be combined with various embodiments of the present disclosure.

Referring to FIG. 13, in step S1300, the remote UE may be configured with timers for data inactivity of the Uu link and the SL. For example, the remote UE may be configured with timer(s) for data inactivity for at least one of the Uu link or the SL.

For example, the remote UE may be configured with a Uu-data inactivity timer for the Uu link. For example, the remote UE may be configured with a SL-data inactivity timer for the SL. For example, the Uu-data inactivity timer related to the Uu link and/or the SL-data inactivity timer related to the SL may be configured for the remote UE. For example, the remote UE may receive a configuration related to the Uu-data inactivity timer for the Uu link and/or a configuration related to the SL-data inactivity timer for the SL from the network (e.g., base station).

In step S1310, if at least one of the following conditions is satisfied, the remote UE may determine that the data inactivity timer expires. For example, the expiration of the data inactivity timer may be defined as follows.

If the SL-data inactivity timer for the SL expires, or

If the Uu-data inactivity timer for the Uu link expires

In step S1320, if the SL-data inactivity timer of the remote UE expires, the remote UE may inform the relay UE of the expiration. For example, the remote UE may release the PC5 connection and/or the PC5-RRC connection.

In step S1330, if the Uu-data inactivity timer of the remote UE expires, the remote UE may inform the relay UE that the RRC connection is released. For example, if the Uu-data inactivity timer of the remote UE expires, the remote UE may transmit information regarding the release of the RRC connection to the relay UE. For example, the RRC connection may be an RRC connection between the remote UE and the base station.

Based on various embodiments of the present disclosure, even if the Uu data inactivity timer of the relay UE expires, if the SL data inactivity timer does not expire, the relay UE may not enter an RRC_IDLE state. Therefore, the relay UE can still relay data of the remote UE to the base station.

Figure 14:
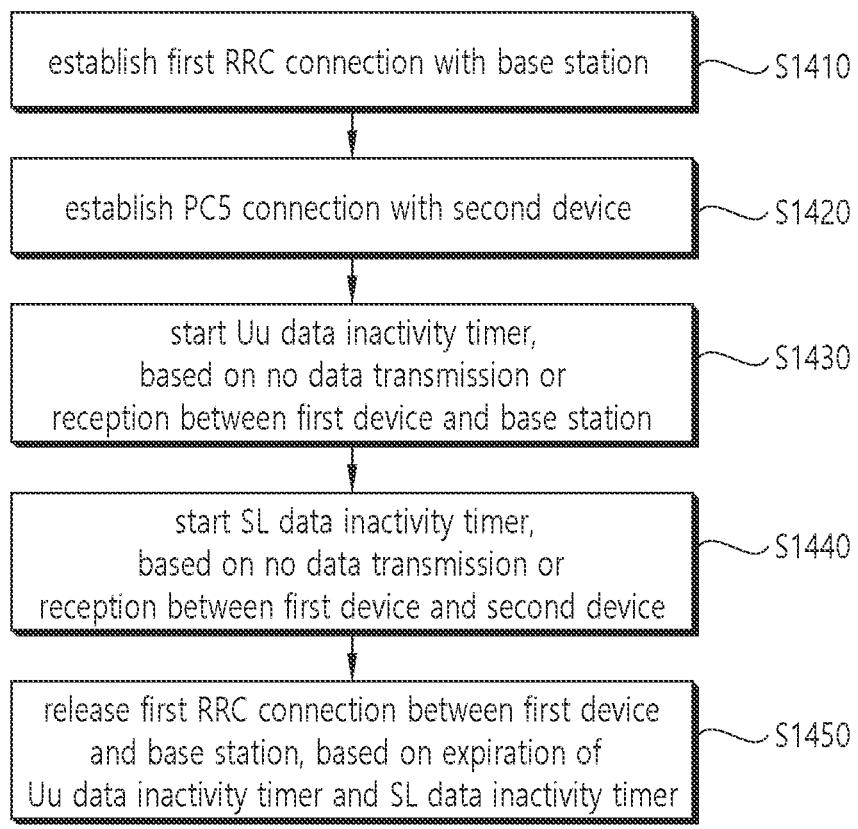
FIG. 14 shows a method for performing wireless communication by a first device relaying communication between a second device and a base station, based on an embodiment of the present disclosure.

FIG. 14 shows a method for performing wireless communication by a first device relaying communication between a second device and a base station, based on an embodiment of the present disclosure. The embodiment of FIG. 14 may be combined with various embodiments of the present disclosure.

Referring to FIG. 14, in step S1410, the first device may establish a first radio resource control (RRC) connection with the base station. In step S1420, the first device may establish a PC5 connection with the second device. In step S1430, the first device may start a Uu data inactivity timer, based on no data transmission or reception between the first device and the base station. In step S1440, the first device may start a sidelink (SL) data inactivity timer, based on no data transmission or reception between the first device and the second device. In step S1450, the first device may release the first RRC connection between the first device and the base station, based on an expiration of the Uu data inactivity timer and the SL data inactivity timer. For example, the Uu data inactivity timer may be configured for the first device, and the SL data inactivity timer may be configured for the first device.

For example, based on the expiration of the Uu data inactivity timer and the SL data inactivity timer, the first RRC connection between the first device and the base station may be autonomously released by the first device.

For example, based on that at least one of the Uu data inactivity timer or the SL data inactivity timer does not expire, the first RRC connection between the first device and the base station may not be released by the first device.

Additionally, for example, the first device may transmit, to the second device, information related to the release of the first RRC connection based on the expiration of the Uu data inactivity timer and the SL data inactivity timer.

For example, a relay reselection procedure of the second device or a switching procedure to a Uu link of the second device may be triggered based on information related to the release of the first RRC connection.

For example, based on establishment of a second RRC connection between the second device and the base station, the switching procedure to the Uu link of the second device may be performed in response to the information related to the release of the first RRC connection. For example, based on establishment of a second RRC connection between the second device and the base station, the relay reselection procedure of the second device may be performed in response to the information related to the release of the first RRC connection. For example, based on that a third device selected as a relay device of the second device by the relay reselection procedure is in an RRC_IDLE state, an RRC connection request message may be transmitted by the second device to the base station through the third device. For example, based on that a third device selected as a relay device of the second device by the relay reselection procedure is in an RRC_CONNECTED state, data may be transmitted by the second device to the base station through the third device.

For example, based on that a second RRC connection between the second device and the base station is not established, the relay reselection procedure of the second device may be performed in response to the information related to the release of the first RRC connection. For example, based on that a third device selected as a relay device of the second device by the relay reselection procedure is in an RRC_IDLE state, an RRC connection request message may be transmitted by the second device to the base station through the third device. For example, based on that a third device selected as a relay device of the second device by the relay reselection procedure is in an RRC_CONNECTED state, data may be transmitted by the second device to the base station through the third device.

Additionally, for example, the first device may receive, from the base station, a configuration related to the Uu data inactivity timer and a configuration related to the SL data inactivity timer.

The proposed method can be applied to the device(s) based on various embodiments of the present disclosure. First, the processor 102 of the first device 100 may establish a first radio resource control (RRC) connection with the base station. In addition, the processor 102 of the first device 100 may establish a PC5 connection with the second device. In addition, the processor 102 of the first device 100 may start a Uu data inactivity timer, based on no data transmission or reception between the first device and the base station. In addition, the processor 102 of the first device 100 may start a sidelink (SL) data inactivity timer, based on no data transmission or reception between the first device and the second device. In addition, the processor 102 of the first device 100 may release the first RRC connection between the first device and the base station, based on an expiration of the Uu data inactivity timer and the SL data inactivity timer. For example, the Uu data inactivity timer may be configured for the first device, and the SL data inactivity timer may be configured for the first device.

Based on an embodiment of the present disclosure, a first device adapted to relay communication between a second device and a base station may be provided. For example, the first device may comprise: one or more memories storing instructions; one or more transceivers; and one or more processors connected to the one or more memories and the one or more transceivers. For example, the one or more processors may execute the instructions to: establish a first radio resource control (RRC) connection with the base station; establish a PC5 connection with the second device; start a Uu data inactivity timer, based on no data transmission or reception between the first device and the base station; start a sidelink (SL) data inactivity timer, based on no data transmission or reception between the first device and the second device; and release the first RRC connection between the first device and the base station, based on an expiration of the Uu data inactivity timer and the SL data inactivity timer. For example, the Uu data inactivity timer may be configured for the first device, and the SL data inactivity timer may be configured for the first device.

Based on an embodiment of the present disclosure, an apparatus adapted to control a first user equipment (UE) relaying communication between a second UE and a base station may be provided. For example, the apparatus may comprise: one or more processors; and one or more memories operably connected to the one or more processors and storing instructions. For example, the one or more processors may execute the instructions to: establish a first radio resource control (RRC) connection with the base station; establish a PC5 connection with the second UE; start a Uu data inactivity timer, based on no data transmission or reception between the first UE and the base station; start a sidelink (SL) data inactivity timer, based on no data transmission or reception between the first UE and the second UE; and release the first RRC connection between the first UE and the base station, based on an expiration of the Uu data inactivity timer and the SL data inactivity timer. For example, the Uu data inactivity timer may be configured for the first UE, and the SL data inactivity timer may be configured for the first UE.

Based on an embodiment of the present disclosure, a non-transitory computer-readable storage medium storing instructions may be provided. For example, the instructions, when executed, may cause a first device to: establish a first radio resource control (RRC) connection with a base station; establish a PC5 connection with a second device; start a Uu data inactivity timer, based on no data transmission or reception between the first device and the base station; start a sidelink (SL) data inactivity timer, based on no data transmission or reception between the first device and the second device; and release the first RRC connection between the first device and the base station, based on an expiration of the Uu data inactivity timer and the SL data inactivity timer. For example, the Uu data inactivity timer may be configured for the first device, and the SL data inactivity timer may be configured for the first device.

Figure 15:
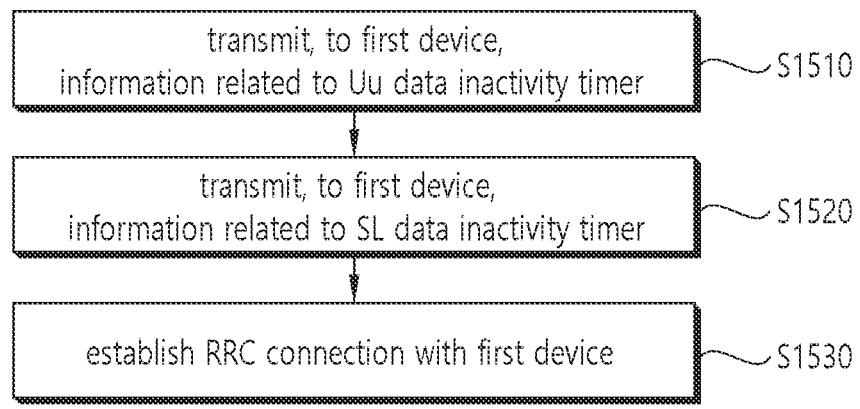
FIG. 15 shows a method for performing wireless communication by a base station, based on an embodiment of the present disclosure.

FIG. 15 shows a method for performing wireless communication by a base station, based on an embodiment of the present disclosure. The embodiment of FIG. 15 may be combined with various embodiments of the present disclosure.

Referring to FIG. 15, in step S1510, the base station may transmit, to a first device, information related to a Uu data inactivity timer. In step S1520, the base station may transmit, to the first device, information related to a sidelink (SL) data inactivity timer. In step S1530, the base station may establish a radio resource control (RRC) connection with the first device. For example, based on no transmission or reception of data between the first device and the base station, the Uu data inactivity timer may be started by the first device, and based on no transmission or reception of data between the first device and a second device, the SL data inactivity timer may be started by the first device, and based on an expiration of the Uu data inactivity timer and the SL data inactivity timer, the RRC connection between the first device and the base station may be released by the first device, and the first device may be a device for relaying communication between the second device and the base station.

The proposed method can be applied to the device(s) based on various embodiments of the present disclosure. First, the processor 202 of the base station 200 may control the transceiver 206 to transmit, to a first device, information related to a Uu data inactivity timer. In addition, the processor 202 of the base station 200 may control the transceiver 206 to transmit, to the first device, information related to a sidelink (SL) data inactivity timer. In addition, the processor 202 of the base station 200 may establish a radio resource control (RRC) connection with the first device. For example, based on no transmission or reception of data between the first device and the base station, the Uu data inactivity timer may be started by the first device, and based on no transmission or reception of data between the first device and a second device, the SL data inactivity timer may be started by the first device, and based on an expiration of the Uu data inactivity timer and the SL data inactivity timer, the RRC connection between the first device and the base station may be released by the first device, and the first device may be a device for relaying communication between the second device and the base station.

Based on an embodiment of the present disclosure, a base station adapted to perform wireless communication may be provided. For example, the base station may comprise: one or more memories storing instructions; one or more transceivers; and one or more processors connected to the one or more memories and the one or more transceivers. For example, the one or more processors may execute the instructions to: transmit, to a first device, information related to a Uu data inactivity timer; transmit, to the first device, information related to a sidelink (SL) data inactivity timer; and establish a radio resource control (RRC) connection with the first device. For example, based on no transmission or reception of data between the first device and the base station, the Uu data inactivity timer may be started by the first device, and based on no transmission or reception of data between the first device and a second device, the SL data inactivity timer may be started by the first device, and based on an expiration of the Uu data inactivity timer and the SL data inactivity timer, the RRC connection between the first device and the base station may be released by the first device, and the first device may be a device for relaying communication between the second device and the base station.

Based on an embodiment of the present disclosure, an apparatus configured to control a base station may be provided. For example, the apparatus may comprise: one or more processors; and one or more memories operably connected to the one or more processors and storing instructions. For example, the one or more processors may execute the instructions to: transmit, to a first user equipment (UE), information related to a Uu data inactivity timer; transmit, to the first UE, information related to a sidelink (SL) data inactivity timer; and establish a radio resource control (RRC) connection with the first UE. For example, based on no transmission or reception of data between the first UE and the base station, the Uu data inactivity timer may be started by the first UE, and based on no transmission or reception of data between the first UE and a second UE, the SL data inactivity timer may be started by the first UE, and based on an expiration of the Uu data inactivity timer and the SL data inactivity timer, the RRC connection between the first UE and the base station may be released by the first UE, and the first UE may be a UE for relaying communication between the second UE and the base station.

Based on an embodiment of the present disclosure, a non-transitory computer-readable storage medium storing instructions may be provided. For example, the instructions, when executed, may cause a base station to: transmit, to a first device, information related to a Uu data inactivity timer; transmit, to the first device, information related to a sidelink (SL) data inactivity timer; and establish a radio resource control (RRC) connection with the first device. For example, based on no transmission or reception of data between the first device and the base station, the Uu data inactivity timer may be started by the first device, and based on no transmission or reception of data between the first device and a second device, the SL data inactivity timer may be started by the first device, and based on an expiration of the Uu data inactivity timer and the SL data inactivity timer, the RRC connection between the first device and the base station may be released by the first device, and the first device may be a device for relaying communication between the second device and the base station.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
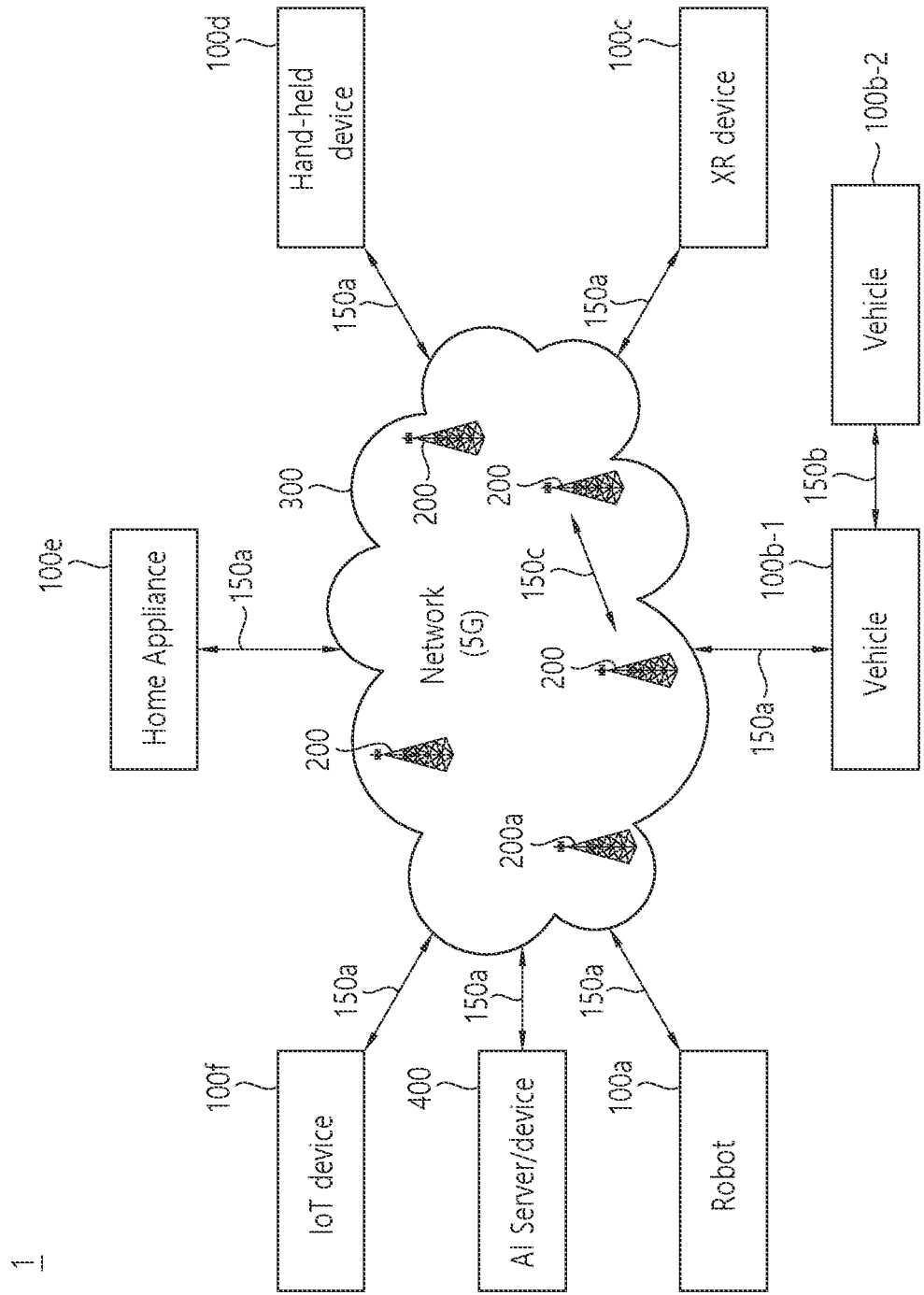
FIG. 16 shows a communication system 1, based on an embodiment of the present disclosure.

FIG. 16 shows a communication system 1, based on an embodiment of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT)

device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
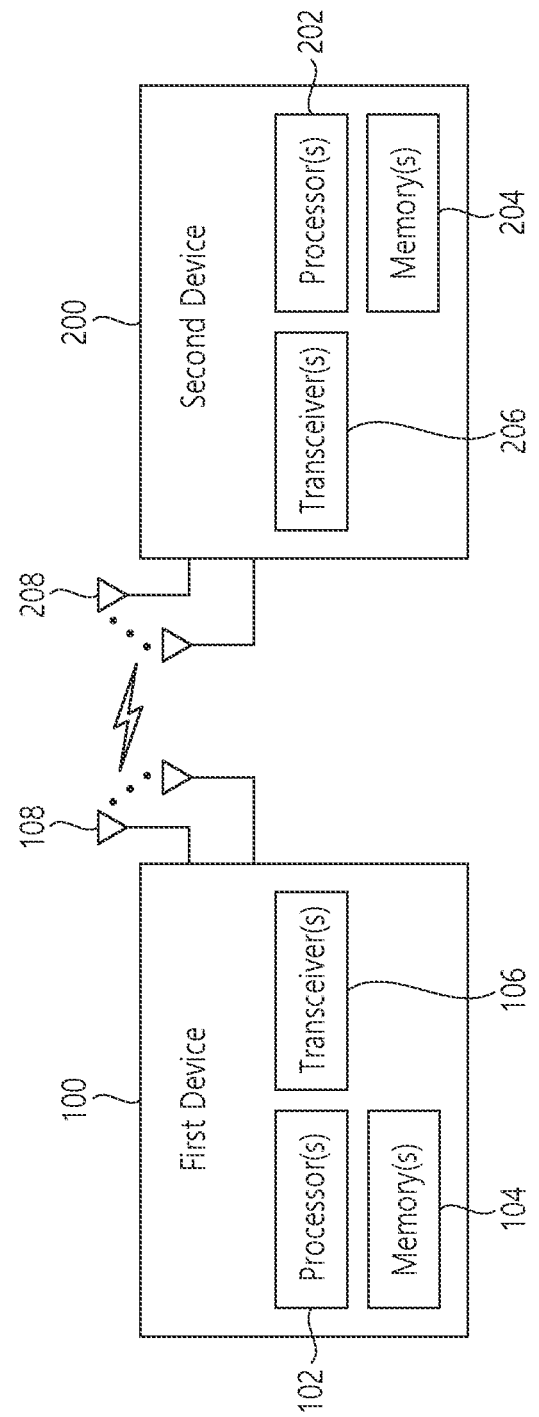
FIG. 17 shows wireless devices, based on an embodiment of the present disclosure.

FIG. 17 shows wireless devices, based on an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100X)} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s)206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs. SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
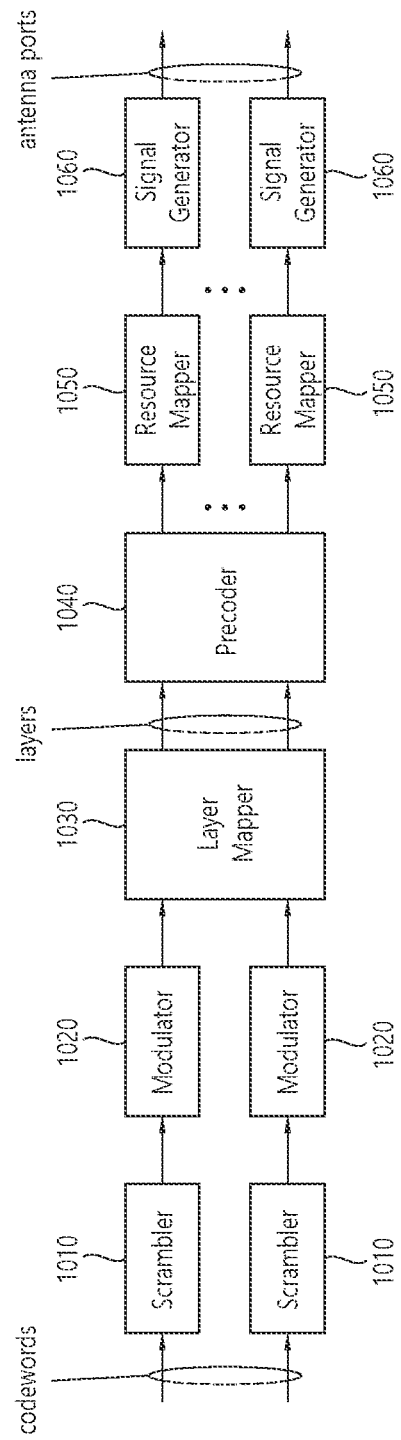
FIG. 18 shows a signal process circuit for a transmission signal, based on an embodiment of the present disclosure.

FIG. 18 shows a signal process circuit for a transmission signal, based on an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs). CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
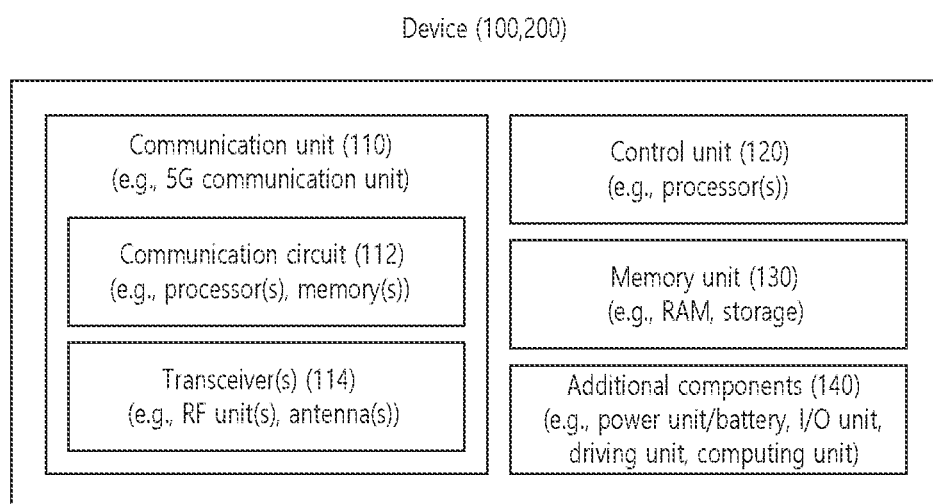
FIG. 19 shows another example of a wireless device, based on an embodiment of the present disclosure.

FIG. 19 shows another example of a wireless device, based on an embodiment of the present disclosure. The wireless device may be implemented in various forms according to a use-case/service (refer to FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
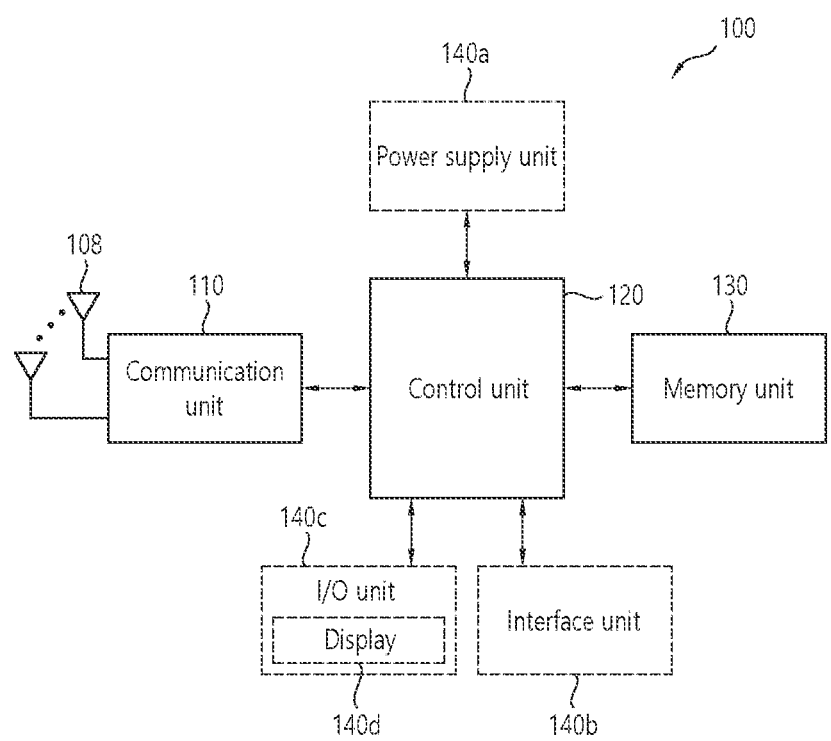
FIG. 20 shows a hand-held device, based on an embodiment of the present disclosure.

FIG. 20 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 21:
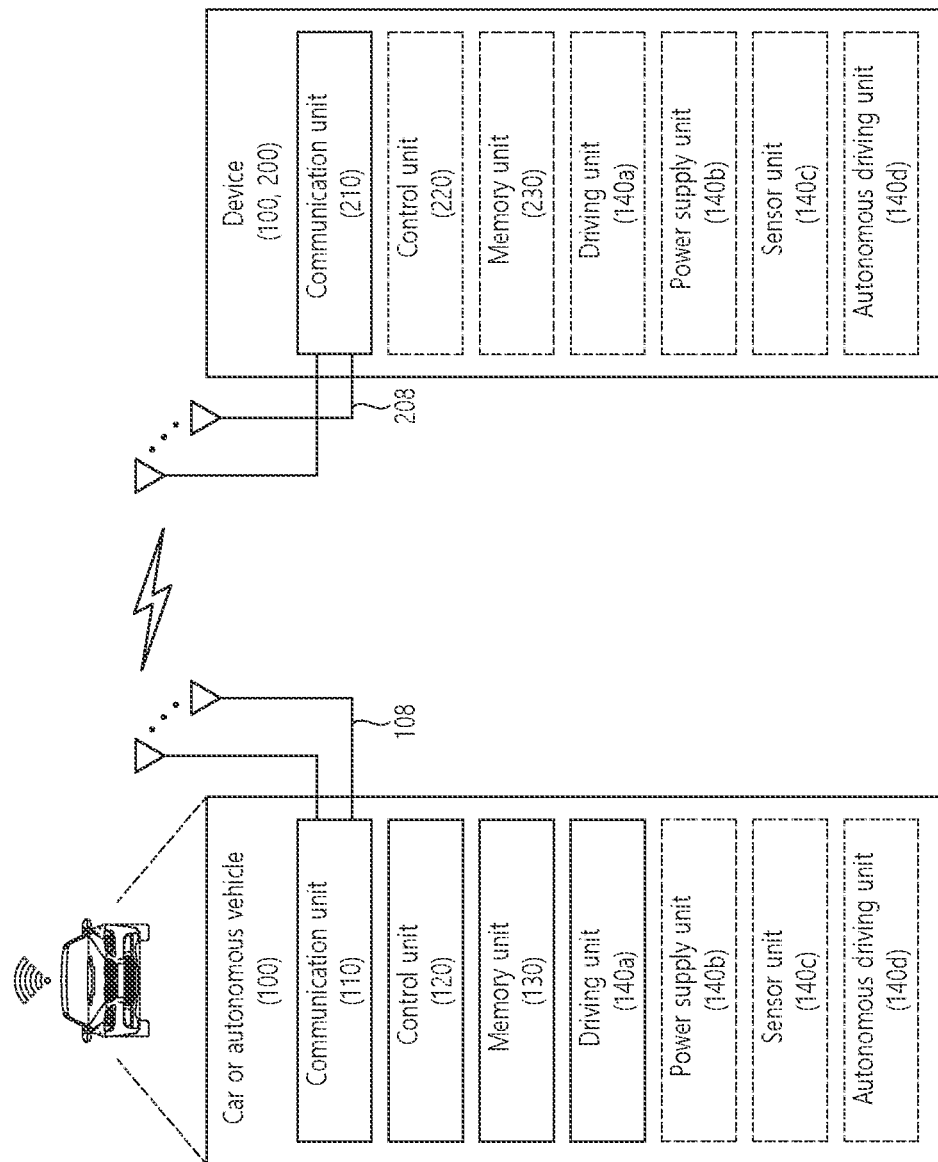
FIG. 21 shows a vehicle or an autonomous vehicle, based on an embodiment of the present disclosure.

FIG. 21 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 21, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:
    establishing, by a first device, a first radio resource control (RRC) connection with a base station;
    establishing, by the first device, a PC5 connection with a second device;
    starting, by the first device, a Uu data inactivity timer for data inactivity operation between the first device and the base station;
    starting, by the first device, a sidelink (SL) data inactivity timer for data inactivity operation between the first device and the second device; and
    releasing, by the first device, the first RRC connection between the first device and the base station, based on (i) an expiration of the Uu data inactivity timer and (ii) an expiration of the SL data inactivity timer,
    wherein the first device is a device relaying communication between the second device and the base station,
    wherein the Uu data inactivity timer is configured for the first device, and
    wherein the SL data inactivity timer is configured for the first device.

2. The method of claim 1, wherein, based on (i) the expiration of the Uu data inactivity timer and (ii) the expiration of the SL data inactivity timer, the first RRC connection between the first device and the base station is autonomously released by the first device.

3. The method of claim 1, wherein, based on that at least one of the Uu data inactivity timer or the SL data inactivity timer does not expire, the first RRC connection between the first device and the base station is not released by the first device.

4. The method of claim 1, further comprising:
    transmitting, to the second device, information related to the release of the first RRC connection based on (i) the expiration of the Uu data inactivity timer and (ii) the expiration of the SL data inactivity timer.

5. The method of claim 1, wherein a relay reselection procedure of the second device or a switching procedure to a Uu link of the second device is triggered based on information related to the release of the first RRC connection.

6. The method of claim 5, wherein, based on establishment of a second RRC connection between the second device and the base station, the switching procedure to the Uu link of the second device is performed in response to the information related to the release of the first RRC connection.

7. The method of claim 5, wherein, based on establishment of a second RRC connection between the second device and the base station, the relay reselection procedure of the second device is performed in response to the information related to the release of the first RRC connection.

8. The method of claim 7, wherein, based on that a third device selected as a relay device of the second device by the relay reselection procedure is in an RRC_IDLE state, an RRC connection request message is transmitted by the second device to the base station through the third device.

9. The method of claim 7, wherein, based on that a third device selected as a relay device of the second device by the relay reselection procedure is in an RRC_CONNECTED state, data is transmitted by the second device to the base station through the third device.

10. The method of claim 5, wherein, based on that a second RRC connection between the second device and the base station is not established, the relay reselection procedure of the second device is performed in response to the information related to the release of the first RRC connection.

11. The method of claim 10, wherein, based on that a third device selected as a relay device of the second device by the relay reselection procedure is in an RRC_IDLE state, an RRC connection request message is transmitted by the second device to the base station through the third device.

12. The method of claim 10, wherein, based on that a third device selected as a relay device of the second device by the relay reselection procedure is in an RRC_CONNECTED state, data is transmitted by the second device to the base station through the third device.

13. The method of claim 1, further comprising:
    receiving, from the base station, a configuration related to the Uu data inactivity timer and a configuration related to the SL data inactivity timer.

14. A first device comprising:
    at least one transceiver;
    at least one processor; and
    at least one memory connected to the at least one processor and storing instructions that, based on being executed, cause the first device to perform operations comprising:
    establishing a first radio resource control (RRC) connection with a base station;
    establishing a PC5 connection with a second device;
    starting a Uu data inactivity timer for data inactivity operation between the first device and the base station;
    starting a sidelink (SL) data inactivity timer for data inactivity operation between the first device and the second device; and
    releasing the first RRC connection between the first device and the base station, based on (i) an expiration of the Uu data inactivity timer and (ii) an expiration of the SL data inactivity timer,
    wherein the first device is a device relaying communication between the second device and the base station,
    wherein the Uu data inactivity timer is configured for the first device, and
    wherein the SL data inactivity timer is configured for the first device.

15. The first device of claim 14, wherein, based on (i) the expiration of the Uu data inactivity timer and (ii) the expiration of the SL data inactivity timer, the first RRC connection between the first device and the base station is autonomously released by the first device.

16. The first device of claim 14, wherein, based on that at least one of the Uu data inactivity timer or the SL data inactivity timer does not expire, the first RRC connection between the first device and the base station is not released by the first device.

17. The first device of claim 14, wherein a relay reselection procedure of the second device or a switching procedure to a Uu link of the second device is triggered based on information related to the release of the first RRC connection.

18. The first device of claim 17, wherein, based on establishment of a second RRC connection between the second device and the base station, the switching procedure to the Uu link of the second device is performed in response to the information related to the release of the first RRC connection.

19. The first device of claim 17, wherein, based on establishment of a second RRC connection between the second device and the base station, the relay reselection procedure of the second device is performed in response to the information related to the release of the first RRC connection.

20. A processing device comprising:
at least one processor; and
at least one memory connected to the at least one processor and storing instructions that, based on being executed, cause a first device to perform operations comprising:
establishing a first radio resource control (RRC) connection with a base station;
establishing a PC5 connection with a second device;
starting a Uu data inactivity timer for data inactivity operation between the first device and the base station;
starting a sidelink (SL) data inactivity timer for data inactivity operation between the first device and the second device; and
releasing the first RRC connection between the first device and the base station, based on (i) an expiration of the Uu data inactivity timer and (ii) an expiration of the SL data inactivity timer,
wherein the first device is a device relaying communication between the second device and the base station,
wherein the Uu data inactivity timer is configured for the first device, and
wherein the SL data inactivity timer is configured for the first device.

\* \* \* \* \*